United States Patent
Sugiyama

[11] Patent Number: 6,150,627
[45] Date of Patent: Nov. 21, 2000

[54] ELECTRIC DISCHARGE MACHINING APPARATUS

[75] Inventor: Kazuhisa Sugiyama, Nagoya, Japan

[73] Assignee: Mitsubishi Denki Kabushiki Kaisha, Tokyo, Japan

[21] Appl. No.: 08/971,715

[22] Filed: Nov. 17, 1997

[30] Foreign Application Priority Data

Apr. 23, 1997 [JP] Japan ............................ 9-106450

[51] Int. Cl.⁷ .............................. B23H 1/00; B23H 7/20; B23H 7/26
[52] U.S. Cl. .................... 219/69.16; 219/69.11; 219/69.15
[58] Field of Search .............. 219/69.15, 69.16, 219/69.11, 69.2, 69.17, 69.14

[56] References Cited

U.S. PATENT DOCUMENTS

| | | | |
|---|---|---|---|
| 4,321,679 | 3/1982 | Fujie et al. | 364/474.34 |
| 4,473,883 | 9/1984 | Yoshida et al. | 414/222.13 |
| 4,928,806 | 5/1990 | Anderson et al. | 198/346.1 |
| 5,018,617 | 5/1991 | Miyata et al. | 198/346.1 |
| 5,248,867 | 9/1993 | Ohba et al. | |
| 5,290,987 | 3/1994 | Davis et al. | |

FOREIGN PATENT DOCUMENTS

| | | |
|---|---|---|
| 216191 | 12/1984 | Germany. |
| 3720157 | 12/1987 | Germany. |
| 4139202 | 6/1992 | Germany. |
| 4223919 | 1/1994 | Germany. |
| 4403327 | 8/1995 | Germany. |
| 62-297049 | 12/1987 | Japan. |
| 3-196933 | 8/1991 | Japan. |
| 4201124 | 7/1992 | Japan. |
| 7-68423 | 3/1995 | Japan. |
| 7185943 | 7/1995 | Japan. |

OTHER PUBLICATIONS

DE–Z:Volker Suhr:Zum Erodieren auf Palettenspannen, in Werkstatt und Betrieb, Band 128 (1995), vol. 6, pp. 556–560.

DE–Z:J.Schaede: Die Peripherie entscheidet, in: Industrie–anzeiger 65/66 (1989). pp. 34, 36.

Patent Abstracts of Japan, vol. 14, No. 355, Jul. 31, 1990 "Electric Discharge Machining Device" & JPA 2–124224 May 11, 1990.

*Primary Examiner*—Geoffrey S. Evans
*Attorney, Agent, or Firm*—Sughrue, Mion, Zinn, Macpeak & Seas, PLLC

[57] ABSTRACT

An electric discharge machining apparatus includes an air blower attached to a head thereof, and when a work pallet is to be taken away from a work chucking device in a machining vessel after completion of machining, the air blower blows air onto the work pallet on the work chucking device before the work pallet is carried away therefrom, so that a machining liquid deposited on the work pallet is blown off and cleared therefrom.

3 Claims, 17 Drawing Sheets

FIG.6

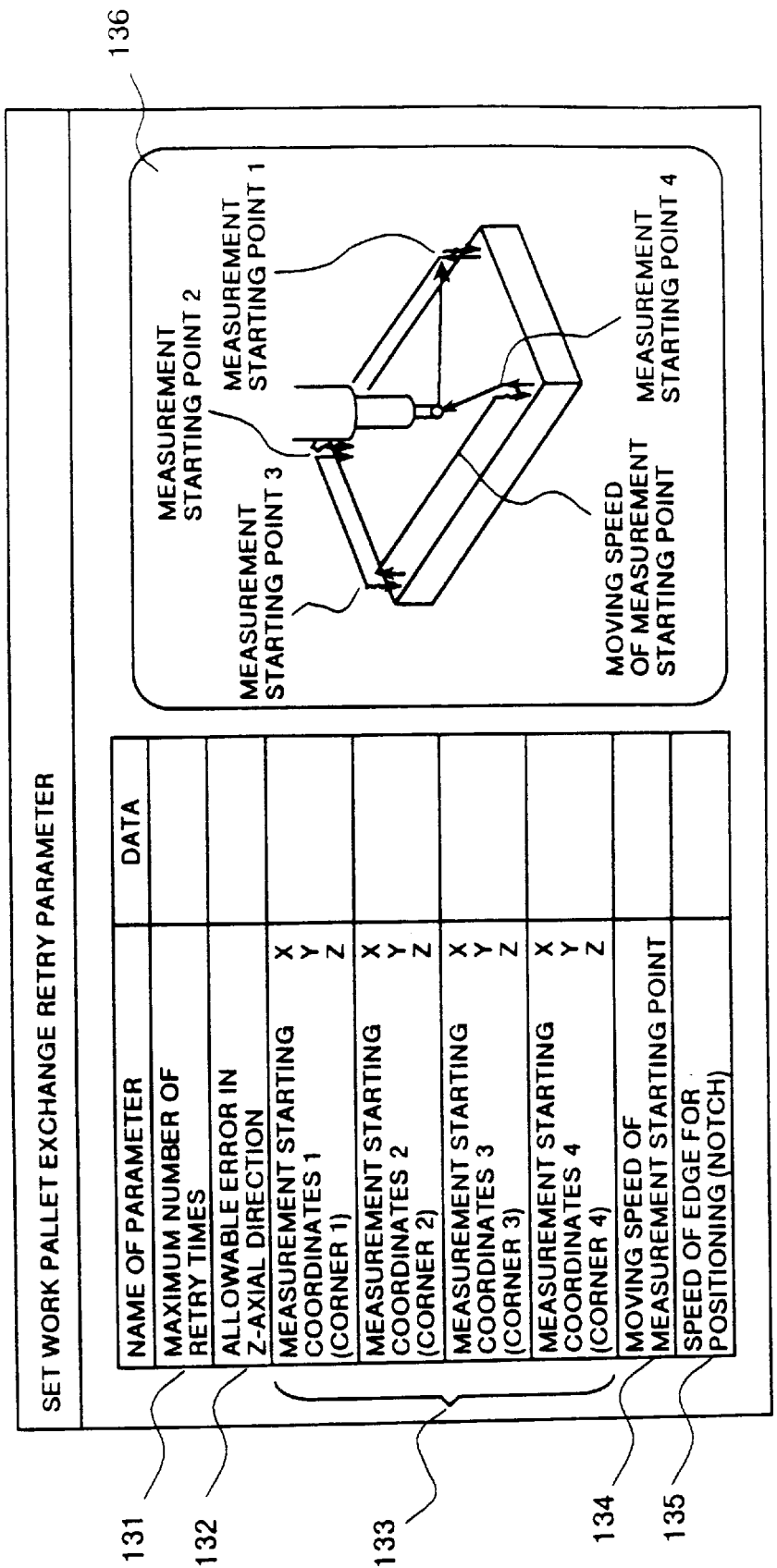

SET WORK PALLET EXCHANGE RETRY PARAMETER

| NAME OF PARAMETER | | DATA |
|---|---|---|
| MAXIMUM NUMBER OF RETRY TIMES | | |
| ALLOWABLE ERROR IN Z-AXIAL DIRECTION | | |
| MEASUREMENT STARTING COORDINATES 1 (CORNER 1) | X Y Z | |
| MEASUREMENT STARTING COORDINATES 2 (CORNER 2) | X Y Z | |
| MEASUREMENT STARTING COORDINATES 3 (CORNER 3) | X Y Z | |
| MEASUREMENT STARTING COORDINATES 4 (CORNER 4) | X Y Z | |
| MOVING SPEED OF MEASUREMENT STARTING POINT | | |
| SPEED OF EDGE FOR POSITIONING (NOTCH) | | |

ELECTRIC DISCHARGE MACHINING APPARATUS

FIELD OF THE INVENTION

The present invention relates to an electric discharge machining apparatus in which an electrode and a work are automatically exchanged to other ones using an automatic electrode exchanger and an automatic work exchanger respectively.

BACKGROUND OF THE INVENTION

FIG. 13 shows an automation system of an electric discharge machining apparatus based on the conventional technology. The electric discharge machining apparatus executes machining, in a state in which an electrode 3 exchangeably attached to a main shaft clamping device 9 of a head 1 by an automatic electrode exchanger (ATC) 2 and a work W together with a work pallet 5 carried onto a work chucking device 10 of a work table 7 in the machining vessel 6 by an automatic work exchanger (AWC) 4 are opposite to each other, by having electric discharge executed in an insulating machining liquid stored in a machining vessel 6 with a Z-axis driving actuator (not shown) making the head 1 vertically move while a voltage is loaded thereto by a power supply unit not shown in the figure.

The automatic electrode exchanger 2 comprises an ATC robot arm 11 for attaching the electrode 3 to the head 1 and an ATC controller 12 for controlling the ATC robot arm 11 according to an electrode exchange instruction from a numerical controller 15.

The automatic work exchanger 4 comprises an AWC robot arm 13 for taking in/taking out a work W and an AWC controller 14 for controlling the AWC robot arm 13 according to a work exchange instruction from the numerical controller 15.

The numerical controller 15 prepares and executes a machining program, controls scheduled operation of the machining program, and also controls instructions of exchanging an electrode and a work to others to the controllers 12, 14 of the automatic electrode exchanger 2/automatic work exchanger 4 respectively. Connected to the numerical controller 15 are a CRT 16 as a display unit and a keyboard (control board) 17 through which data input is executed thereto for preparation of a machining program as well as for schedule registration.

The ATC controller 12, AWC controller 14, main shaft clamping device 9, and the work chucking device 10 are connected to the numerical controller 15 through cables 18, 19, 20, 21 respectively so that data communications can be established therebetween.

FIG. 14 shows an automatic electrode exchanger system based on the conventional technology. The automatic electrode exchanger 2 holds the electrode 3 in a tool magazine 30, and the tool magazine 30 is divided, rotated, and driven by a magazine rotating motor 31. An electrode detecting sensor 32 for detecting whether the electrode 3 is present in the tool magazine (tool pot) 30 or not is mounted on the tool magazine 30.

The numerical controller 15 has a machining program memory section 40 for storing therein a machining program and a program analyzing section 41 for analyzing the machining programs, and the program analyzing section 41 includes an electrode exchange instruction detecting section 42 for analyzing the electrode exchange instruction in the machining program and outputting the electrode exchange instruction to the ATC controller 12.

The ATC controller 12 comprises an electrode exchange instruction/magazine-number analyzing section 50 for converting the electrode exchange instruction from the electrode exchange instruction detecting section 42 to an actual magazine number of the automatic electrode exchanger 2; a section for detecting an electrode placed in a magazine 51 for detecting whether an electrode 3 as an object for exchange instruction is present inside the tool magazine 30 or not according to a signal from the electrode detecting sensor 32; an electrode exchange sequence control section 52 for controlling sequential operations such as movement of the ATC robot arm 11 when the electrode 3 is actually exchanged, rotation of the tool magazine, and opening/closing of a main-shaft clamp; and a magazine-rotation instructing section 53 for receiving the magazine rotation instruction from the electrode exchange sequence control section 52 to instruct actual rotation to the magazine rotating motor 31.

FIG. 15 shows an automatic work exchanging system based on the conventional technology. The automatic work exchanger 4 holds a work W together with the work pallet 5 in a pallet magazine 60, and the pallet magazine 60 is divided, rotated, and driven by a magazine rotating motor 61. A work detecting sensor 62 for detecting whether the work pallet 5 is present in the pallet magazine 60 or not is mounted on the pallet magazine 60.

The program analyzing section 41 in the numerical controller 15 includes a work exchange instruction detecting section 43 for analyzing an work exchange instruction in the machining program and outputting the work exchange instruction to the AWC controller 14.

The AWC controller 14 comprises a work exchange instruction/magazine-number analyzing section 70 for converting the work exchange instruction from the work exchange instruction detecting section 43 to an actual magazine number of the automatic work exchanger 4; a section for detecting a work placed in a magazine 71 for detecting whether a work W (work pallet 5) as an object for exchange instruction is present inside the pallet magazine 60 or not according to a signal from the work detecting sensor 62; a work exchange sequence control section 72 for controlling sequential operations such as movement of the AWC robot arm 13 when the work W is actually exchanged, rotation of a pallet magazine, and opening/closing of a work clamp; and a magazine-rotation instructing section 73 for receiving the magazine rotation instruction from the work exchange sequence control section 72 to instruct actual rotation to the magazine rotating motor 61.

FIG. 16 shows a control board of an automatic electrode exchanger based on the conventional technology. The control board comprises a start key 80 for restarting the apparatus when an alarm occurs during an operation for exchanging electrodes; a stop key 81 for forcefully terminating an electrode exchange sequence regardless of any instruction from the numerical controller 15; keys 82, 83 for rotating the magazine 30 in the automatic electrode exchanger 2 in a regular direction and in a reverse direction respectively; a single step key 84 for executing the electrode exchange sequence in each step at the time of adjustment; a key 85 for manually turning ON/OFF the main shaft clamping device 22 of the electric discharge machining apparatus and manually exchanging electrodes; an electrode number display section 86 for displaying an electrode exchange instruction number from the numerical controller 15; and an emergency stop key 87, and when the emergency stop key 87 is pressed down, a supply power source to the automatic electrode exchanger 2 is tuned OFF.

FIG. 17 shows a control board of an automatic work exchanger based on the conventional technology. The control board comprises a start key 90 for restarting the apparatus when an alarm occurs during exchanging works; a stop key 91 for forcefully terminating a work exchange sequence regardless of any instruction from the numerical controller 15; keys 92, 93 for rotating the magazine 60 in the automatic work exchanger 4 in a regular direction and in a reverse direction respectively; a single step key 94 for executing the work exchange sequence in each step at the time of adjustment; a key 95 for manually turning ON/OFF the work chucking device 23 in the machining vessel 6 and manually exchanging works; a work number display section 96 for displaying a work exchange instruction number (a machining pallet number) from the numerical controller 15; and an emergency stop key 97, and when the emergency stop key 97 is pressed down, a supply power source to the automatic work exchanger 4 is tuned OFF.

In the automation system of the electric discharge machining apparatus based on the conventional technology as described above, when machining is completed, a work pallet mounting thereon a work is instantly carried out from a machining vessel to an AWC magazine by a robot arm of the automatic work changer, so that a machining liquid containing some sludge drops onto the work chucking device when the pallet is being carried out immediately after the machining is completed, then, when the following pallet is chucked, the sludge together with the pallet is caught by the work chucking device, which makes positional precision in pallet exchanging operation worse.

Conventionally, as machining is executed without checking whether exchange of pallets is carried out with precision or not, once the sludge has been caught in the work pallet, a large number of defective components are made in the machining under scheduled operation.

With those operations, the automation system in the conventional type of electric discharge machining apparatus is impossible to continuously run the apparatus for a long period of time with no trouble under the scheduled operation.

Also, in the automatic electrode exchanger and automatic work exchanger each based on the conventional technology, a returned magazine of an electrode or of a work in machining is not indicated, so that, when an electrode or a work to be used for the following machining is to be fed, it is erroneously mounted on the returned magazine, and the apparatus is disabled due to the error before the following machining is started.

Further, in the automatic electrode exchanger and automatic work exchanger each based on the conventional technology, there are not provided therein doors for feeding therein an electrode and a work respectively and a door-open/close checking mechanism for checking open/close of the door, and for this reason, the machining program of the electric discharge machining apparatus is required to be terminated when an electrode or a work is to be fed to, so that an electrode and a work used for the following machining can not be fed during the machining. Therefore, continuous unmanned operation can not be executed over a long period of time in the nighttime or so.

SUMMARY OF THE INVENTION

It is an object to obtain an electric discharge machining apparatus which can continuously run for a long period of time under scheduled operation without any trouble by maintaining positional precision in pallet exchanging operation as well as by eliminating malfunction in attachment of the electrode and the work pallet to magazines respectively, and which can accumulate setup processes by enabling execution of the setup processes for feeding the electrode and work thereto before the machining program being executed is terminated and can execute continuous unmanned operation for a long period of time in the nighttime or so.

In the electric discharge machining apparatus according to the above invention, when a work pallet is to be taken away from the work chucking device in the machining vessel after completion of machining, the air blower blows air onto the work pallet on the work chucking device before the work pallet is carried away therefrom, so that a machining liquid deposited on the work pallet is blown off and cleared therefrom.

In the electric discharge machining apparatus according to the above invention, air is blown out from the air blower while the head is moved in accordance with a size of the work pallet, so that a machining liquid deposited on the work pallet is blown off and cleared therefrom regardless of the size of a work pallet.

In the electric discharge machining apparatus according to the above invention, when a deviation between a pallet position measured by the pallet position measuring means and a specified pallet position is not less than an allowable value, the automatic work exchanger carries away the same work pallet from and carries it again onto the work chucking device.

In the electric discharge machining apparatus according to the above invention, the work-chucking surface of the work chucking device is cleaned by blowing air thereonto by the air blower after the work pallet is carried away from the work chucking device.

In the electric discharge machining apparatus according to the above invention, the ID reader reads an ID number of an ID tag attached to an electrode, the magazine-number/ID-number detecting section manages electrodes each having an ID number which is stored in each magazine of the automatic electrode exchanger according to the read-out information by the ID reader, the electrode-number instruction/ID-number converting section converts an electrode exchange instruction according to the electrode number to an ID number using the correlated data from the machining information managing section between the electrode exchange instruction and the ID number, the ID-number/magazine-number analyzing section converts the electrode exchange instruction according to the ID number to a magazine number according to the information from the machining information managing section when the electrode exchange instruction is issued for electrode exchanging operation according to ID numbers, and the returned magazine number display section displays a returned magazine number of the electrode attached to the main shaft of the electric discharge machining apparatus.

In the electric discharge machining apparatus according to the above invention, the ID reader reads an ID number of an ID tag attached to a work pallet, the magazine-number/ID-number detecting section manages work pallets each having an ID number which is stored in each magazine of the automatic work exchanger according to the read-out information by the ID reader, the work-number instruction/ID-number converting section converts a work exchange instruction according to the work number to an ID number using the correlated data from the machining information managing section between the work exchange instruction and the ID number, the ID-number/magazine-number analyzing section converts the work exchange instruction according to the ID number to a magazine number according to the information from the machining information managing section when the work exchange instruction is issued for work exchanging operation according to ID numbers, and the returned magazine number display section displays a returned magazine number of the work pallet attached in the machining vessel of the electric discharge machining apparatus.

In the electric discharge machining apparatus according to the above invention, when the ATC door is opened, even if an electrode exchange instruction is issued, the instruction is neglected, and door interlocking is so executed that electrode exchanging operation is executed again when the ATC door is closed, so that an electrode required for the next machining can be mounted thereon during the scheduled operation.

In the electric discharge machining apparatus according to the above invention, when the AWC door is opened, even if a work exchange instruction is issued, the instruction is neglected, and door interlocking is so executed that work exchanging operation is executed again when the AWC door is closed, so that a work required for the next machining can be mounted thereon during the scheduled operation.

Other objects and features of this invention will become understood from the following description with reference to the accompanying drawings.

BRIEF DESCRIPTION OF THE DRAWINGS

FIG. 6 is an explanatory view showing a parameter setting screen of retry of work pallet exchanging operation;

DESCRIPTION OF THE PREFERRED EMBODIMENT

Figure 1:
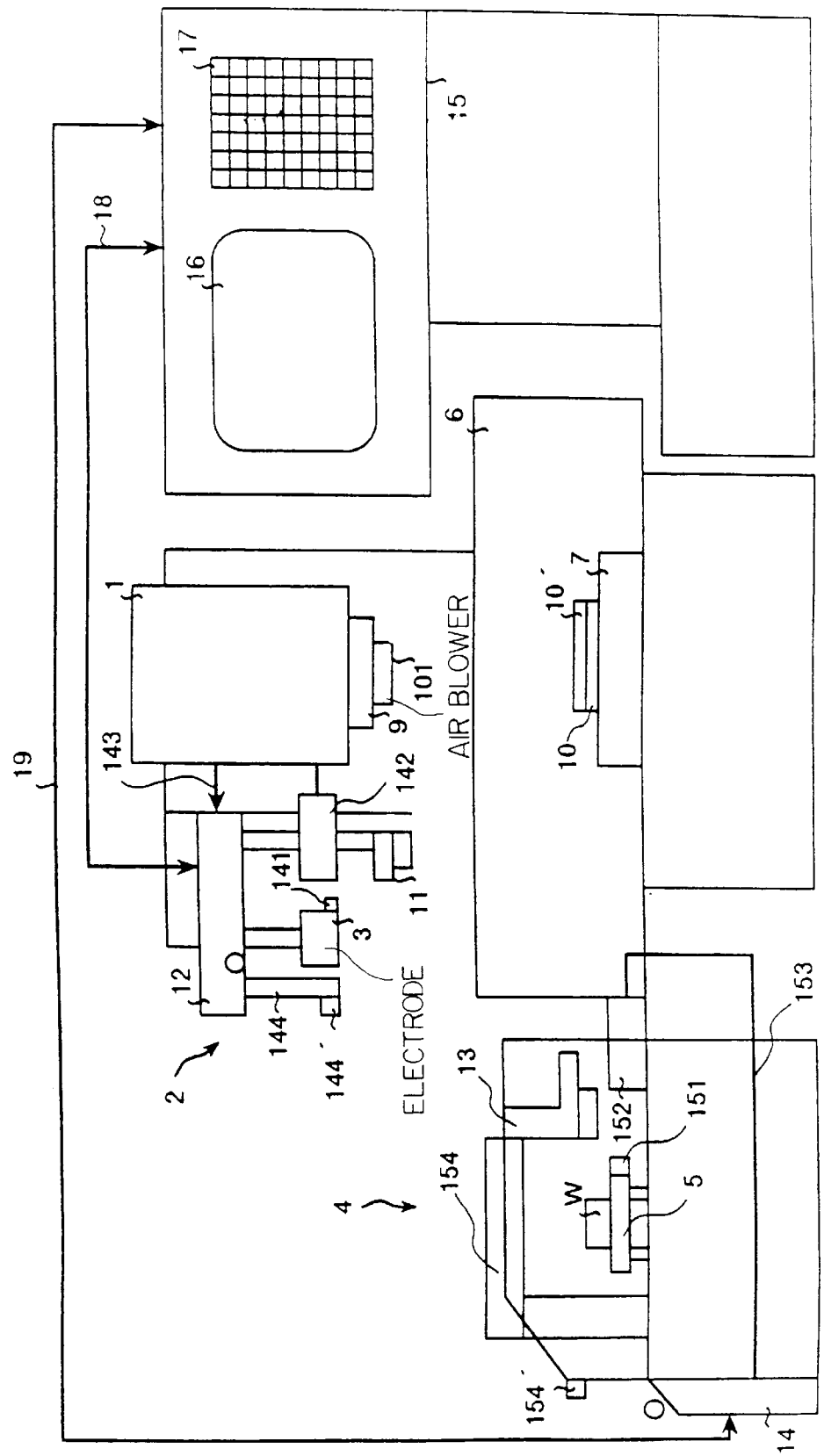
FIG. 1 is a system block diagram showing one embodiment of the electric discharge machining apparatus with an ATC and AWC according to the present invention.

Detailed description is made hereinafter for embodiments of the present invention with reference to the attached drawings. It should be noted that, in the embodiments of the present invention described below, the same reference numerals are assigned to the same components corresponding to those in the example based on the conventional technology, so that description thereof is omitted herein.

FIG. 1 shows one embodiment of the electric discharge machining apparatus with an ATC and an AWC according to the present invention.

Figure 2:
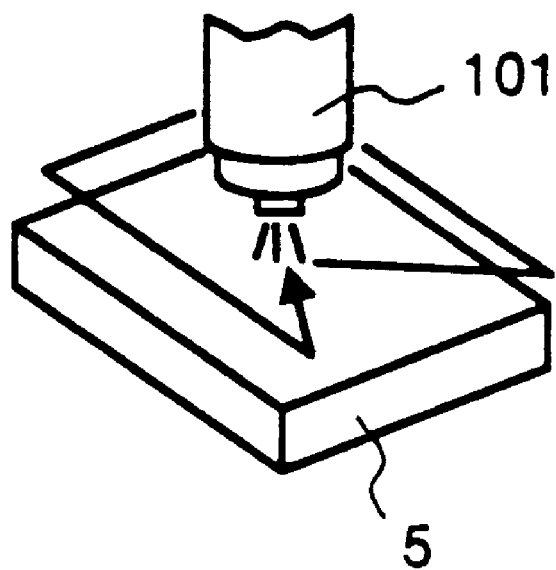
FIG. 2 is a perspective view showing configuration of cleaning a work pallet.

A head 1 is movable in each of X-, Y- and Z-axial directions by a servo system for each of the axes not shown in the figure, and an air blower 101 is attached in a downward posture to the head 1. The air blower 101 blows air onto a work pallet 5, as shown in FIG. 2, while the head 1 is moved in the axial direction in accordance with the size of the work pallet 5 before the pallet is carried out after the machining is completed, so that a machining liquid on the work pallet 5 is blown off and cleared therefrom.

Cleaning of this work pallet is set, actually in a work exchange sequence of the automatic work exchanger 4, as a step executed immediately after a work carried-out instruction according to determination that machining is completed is received in one step before the step of carrying out a work.

Figure 3:
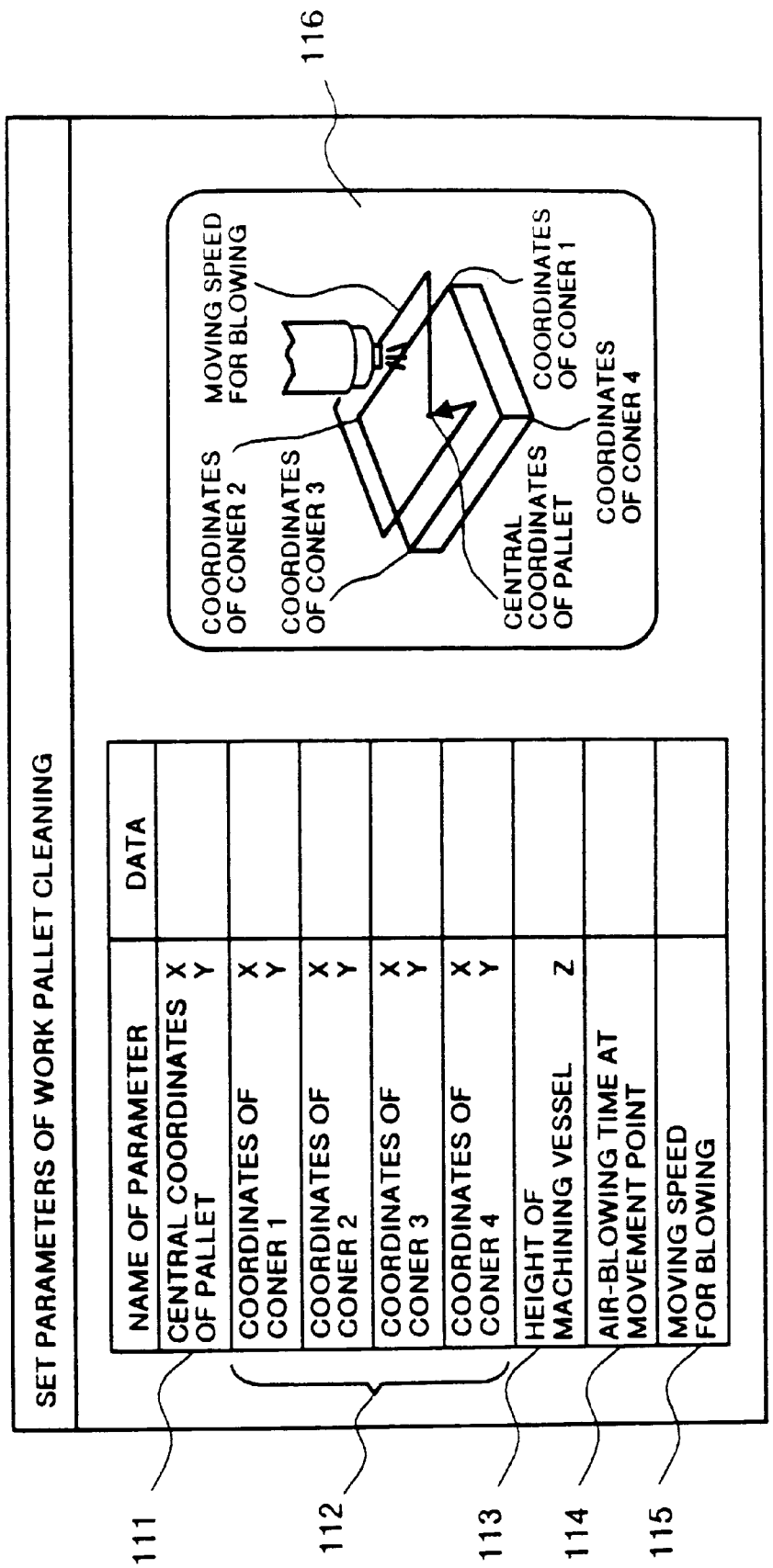
FIG. 3 is an explanatory view showing a parameter setting screen of the work pallet cleaning.

Parameters of the work pallet cleaning are set on a work pallet cleaning parameter setting screen as shown in FIG. 3. This parameter setting screen comprises an input section 111 for central coordinates of the work pallet 5 on the work chucking device 10, an input section 112 for XY coordinates of each corner of the work pallet 5, an input section 113 for a height of a machining vessel (a coordinate of the Z-axis), a setting section 114 for an air-blowing time at each movement point, a setting section 115 for a speed when the head 1 is moved while air is being blown out, and a display section 116 for an explanatory view showing input parameters, and each parameter of the work pallet cleaning is interactively set by a user.

Figure 4:
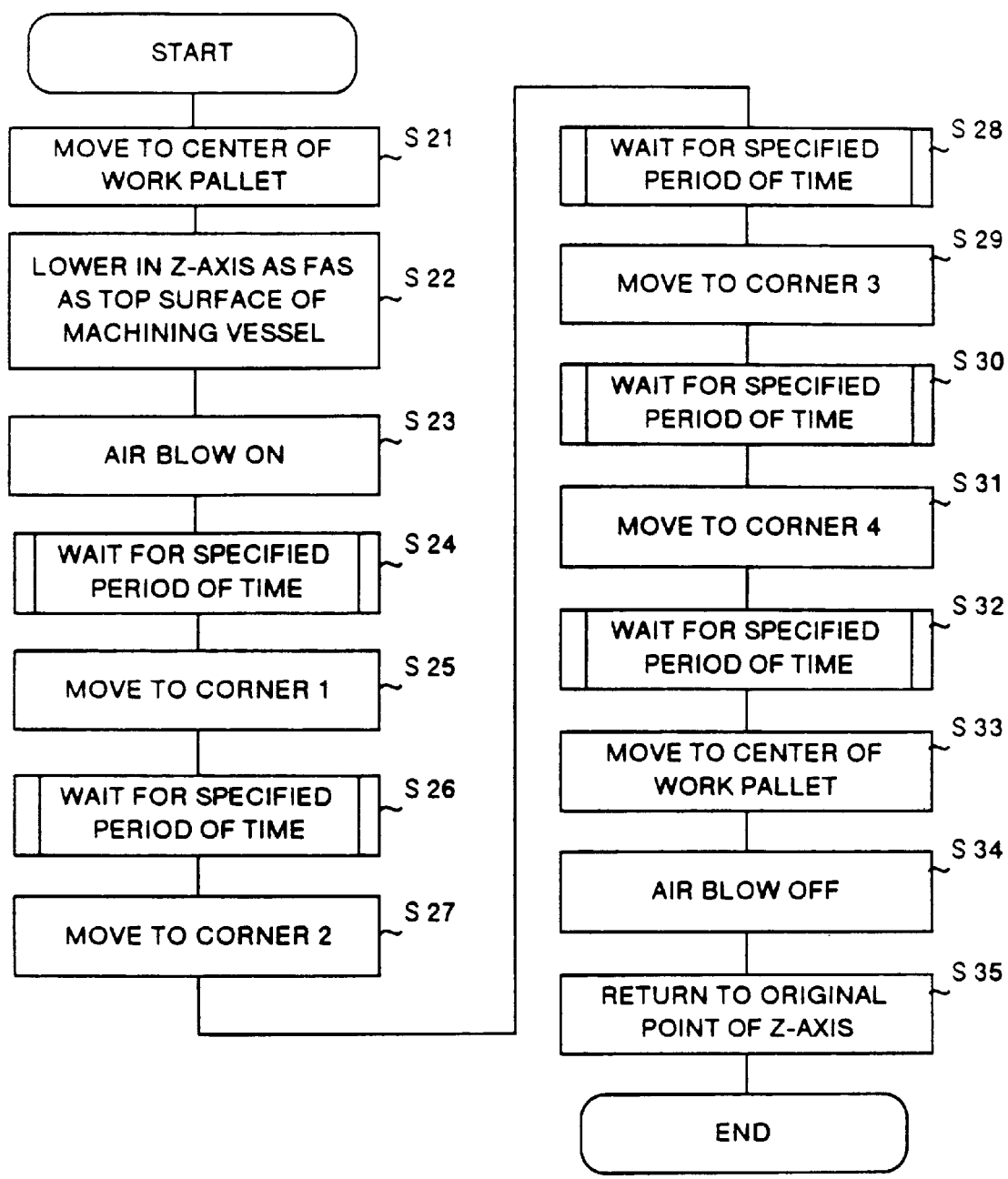
FIG. 4 is a flowchart showing an operational flow of the work pallet cleaning operation executed before the work pallet is carried away.

FIG. 4 shows an operational flow of the work pallet cleaning executed before the work pallet is taken out. The head 1 is moved in an axial direction to the center of the work pallet of which coordinates are previously registered on the parameter setting screen of the work pallet cleaning shown in FIG. 3 (step S21), similarly, the head 1 is lowered (lowered in the Z-axis) as far as a top surface of the machining vessel 6 of which coordinates are previously registered thereon (step S22), an air blow switch is turned ON (step S23), and air bursts forth from the air blower 101. Then the head 1 is stopped at the central position of the work pallet in a state in which air is being blown out from the air blower 101 for a previously registered period of time (step S24).

When the above operation is completed, the head 1 is moved to a corner 1 of the work pallet of which coordinates are previously registered thereon in a state in which air is being blown out from the air blower 101 (step S25), then the head 1 is stopped at the position of the corner 1 in a state in which air is being blown out therefrom again for a previously registered period of time (step S26).

Similarly, the head 1 moves around each of corners 2, 3, 4 of the work pallet and air is blown thereonto for a specified period of time at each of the corners (step S27 to step S32), then, the head 1 returns to the center of the work pallet (step S33), the air blow switch is turned OFF to stop air blowing from the air blower 101 (step S34), and the head 1 is returned to the original point of the Z-axis in the uppermost position of the Z-axis (step S35).

With the above operations, a machining liquid on the work pallet 5 is blown off, so that the machining liquid containing some sludge is prevented from dropping onto the work chucking device 10 when the work pallet 5 is taken out from the machining vessel 6 to the AWC magazine, and accordingly there is no possibility that the work chucking device catches in the sludge together with a next pallet when the pallet is chucked thereby.

As a result, positional precision in pallet exchanging operation can be maintained and continuous running for a long period of time under the scheduled operation can be executed without any trouble.

Figure 5:
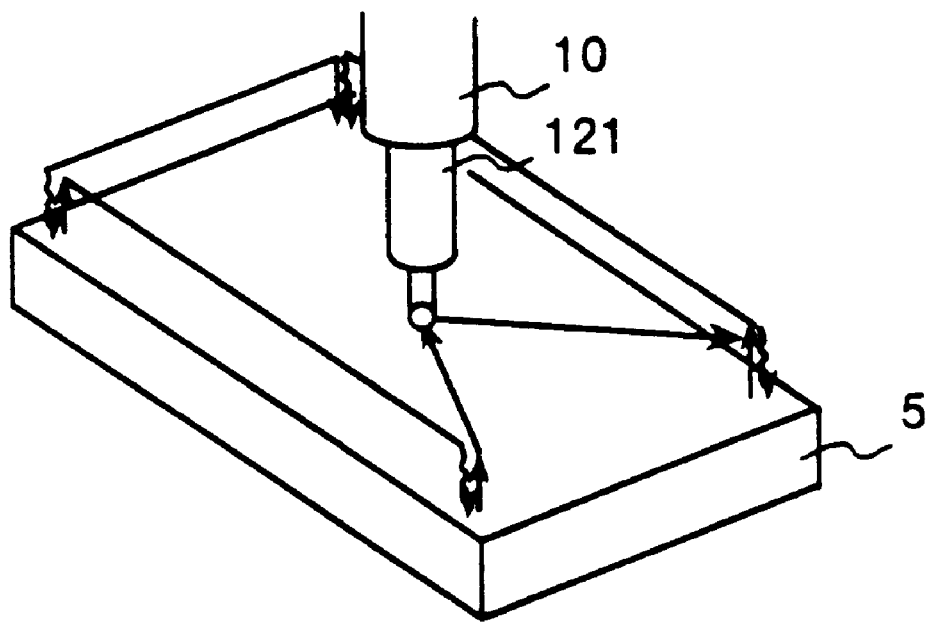
FIG. 5 is a perspective view showing configuration of measuring a position of the work pallet.

When the work pallet 5 has completely be carried onto the work chucking device 10, as shown in FIG. 5, a reference electrode 121 as a measurement probe is set to the main shatt clamping device 9 of the head 1, a position (Z-axial position) of the work pallet 5 is measured by the reference electrode 121 after work pallets are exchanged, the numerical controller 15 makes determination as to whether a deviation between the measured value of the Z-axial position and a set value is within an allowable value or not, and if it is determined that the deviation therebetween is within the allowable value, electric discharge machining is started, but if it is determined that the deviation therebetween is not within the allowable value, a retry instruction for carrying out the pallet therefrom and carrying it again thereonto is outputted to the AWC controller 14.

Measurement of the Z-axial position of the work pallet 5 according to the reference electrode 121 is executed by detecting contact of the reference electrode 121 with the work pallet 5 according to electric conduction between the reference electrode 121 and the work pallet 5 with a Z-axial coordinate value of the head 1 at that time read by the numerical controller 15.

FIG. 6 shows a work pallet exchange retry parameter setting screen. This parameter setting screen comprises a setting section 131 for setting the maximum number of retry times when precision of work pallet exchange is not sufficient, a setting section 132 for an allowable error in the Z-axial direction of coordinates at the measurement point, an input section 133 for XYZ coordinates at a starting point of measuring corners on the work pallet for measuring precision of the exchanged work pallet 5, a setting section 134 for a speed when the reference electrode is moved to a starting point to be measured in each corner, a setting section 135 for a detecting speed of edges when positioning is executed by means of electric contact, and a display section 136 for an explanatory view showing input parameters, and each parameter of re-trying work pallet exchanging operation is interactively set by a user.

Figure 7:
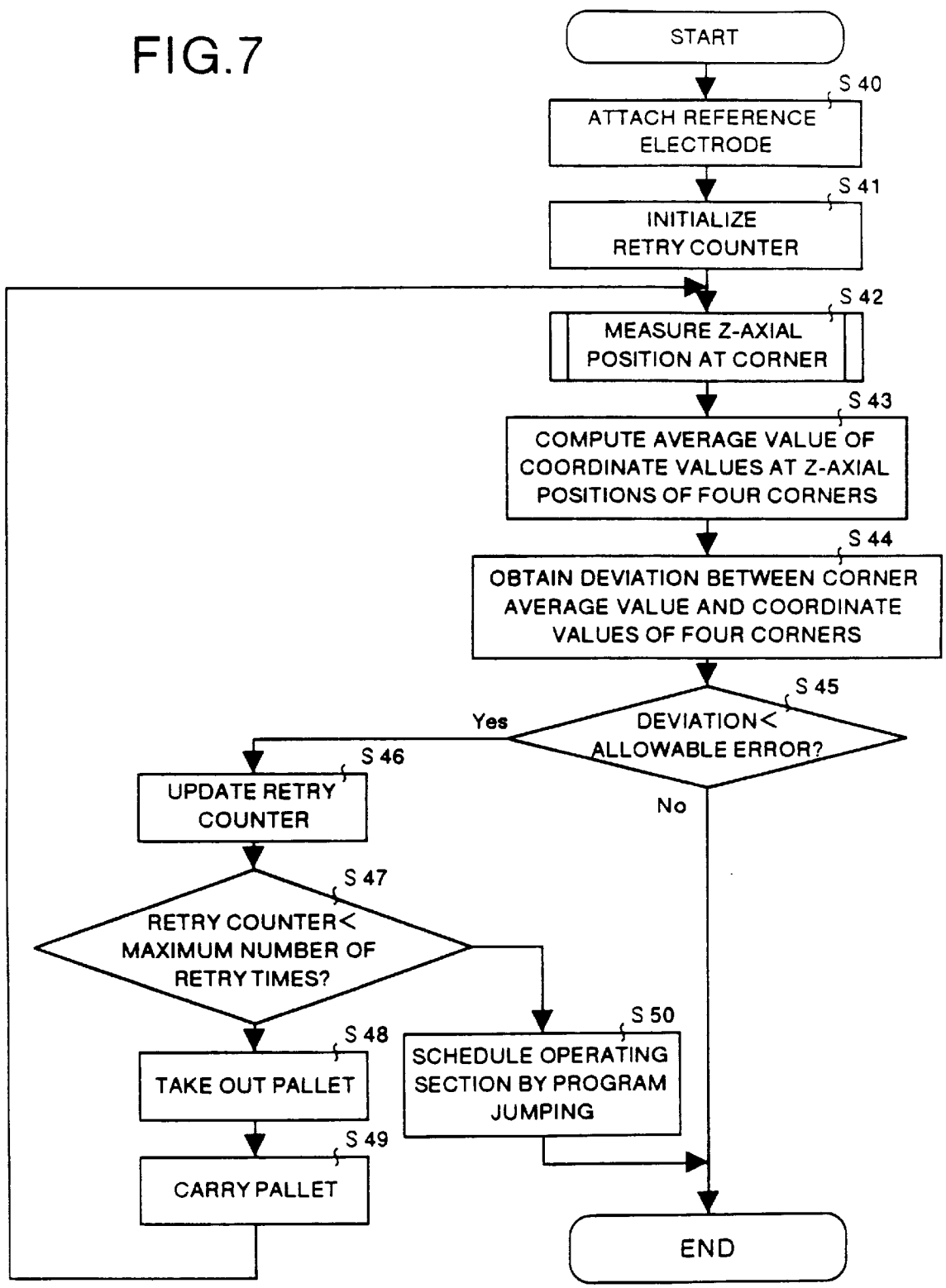
FIG. 7 is a flowchart showing an operational flow of the retry of work pallet exchanging operation.

FIG. 7 shows an operational flow of retry of the work pallet exchanging operation. At first, the reference electrode 121 for measuring the top surface of the work pallet is attached to the main shaft clamping device 9 of the head 1 as prescribed by the automatic electrode exchanger 2.

Then, a counter indicating the number of inserting times of a work pallet 15 is initialized (step S41), after the head is moved to measurement starting points (corners 1 to 4) each of which coordinates are previously registered, a Z-axial position is measured at each corner (step S42), coordinate values of the Z-axial position at each corner is obtained, then the values are stored on the memory in the numerical controller 15.

Then, an average value of the coordinate values at the Z-axial positions of the four corners stored on the memory is computed (step S43), and a deviation between the corner average value and the coordinate values of the four corners (prescribed values) is obtained (step S44).

Then, determination is made as to whether the deviation is within the previously registered allowable error or not (step S45). When it is determined that the deviation is not less than the allowable error (step S45 "affirmative"), the retry counter is updated (step S46), then determination is made as to whether the number of retry times is not less than the previously registered number of times or not (step S47). When it is determined that the number of retry times is not less than the previously registered number of times, the currently executed scheduled operation according to the machining program is terminated, and the processing shifts to the next scheduled operation by program jumping (step S50).

In contrast, when it is determined that the number of retry times is not more than the previously registered number of times, the work pallet 5 is taken out once (step S48), the work-chucking surface provided in the work chucking device 10 is cleaned by the air blower 10', then, after the cleaning, the same work pallet 5 is carried again onto the work chucking device 10 (step S49). That is the retry operation of exchanging a work pallet.

After the work pallet 5 has completely been carried thereon in retry, each processing in step S42 to step S45 is executed again, coordinate values at the Z-axial position of each corner are obtained, an average value of the coordinate values at the Z-axial positions of the corners is computed, and a deviation between the corner average value and the coordinate values of the four corners (prescribed values) is obtained, and determination is made as to whether the deviation is within the previously registered allowable error or not.

With the above operations, determination is automatically made again as to whether a pallet could be exchanged without some sludge being caught in together with the pallet, and when it is determined that the work pallet 5 could not be exchanged to the other with high precision, the work pallet 5 is carried out and again carried in, namely exchange of pallets is retried.

With those operations as described above, positional precision in pallet exchanging operation is also maintained, which makes it possible to execute continuous running of the apparatus for a long period of time under the scheduled operation without any trouble.

Figure 8:
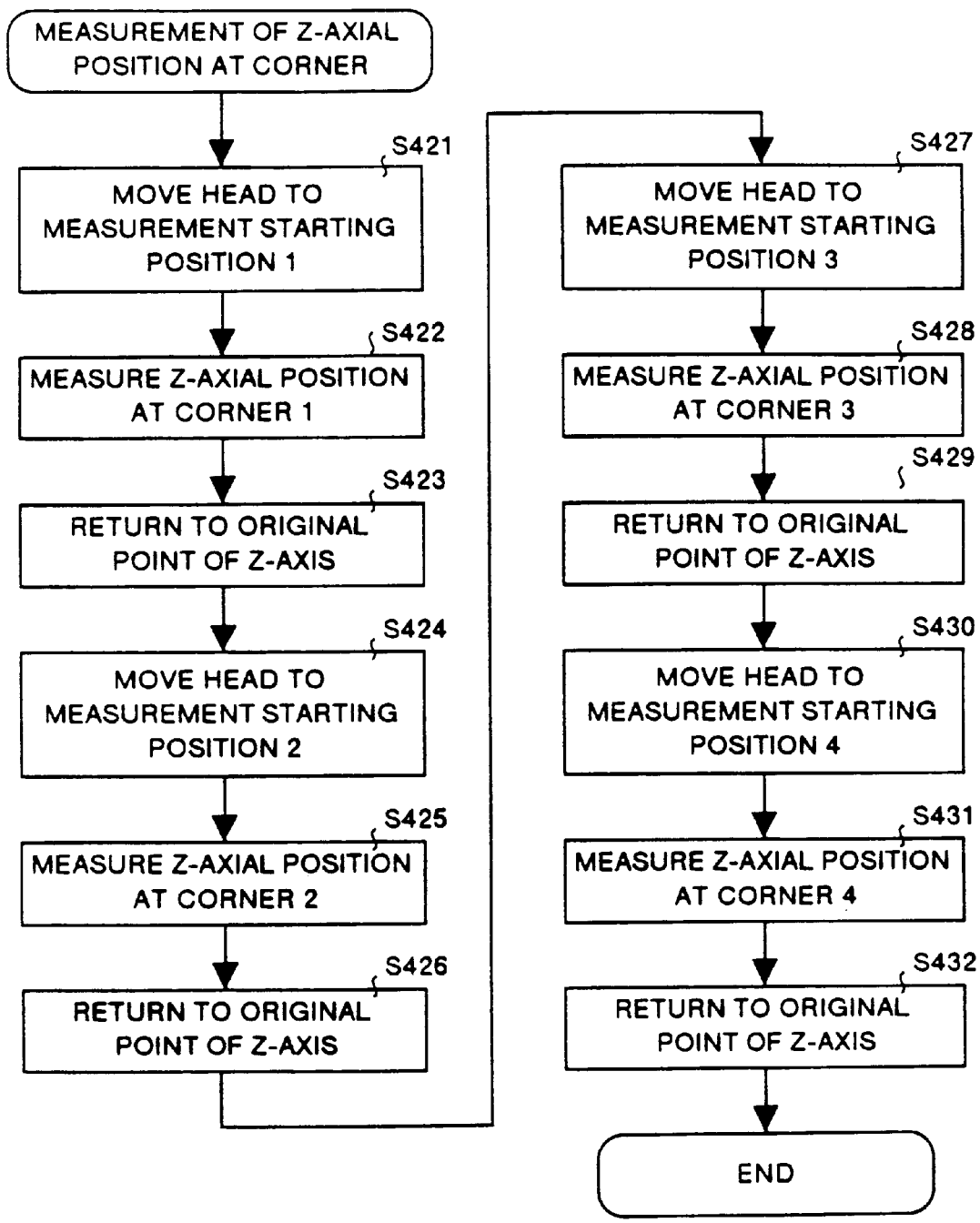
FIG. 8 is a flowchart showing a measuring routine of a Z-axial position.

FIG. 8 shows a measuring routine of a Z-axial position in step S42 shown in FIG. 7. At first, the head 1 is moved to the previously registered starting point 1 of measurement in the order of directions of the X-axis, Y-axis, and Z-axis (step S421), and the coordinate values of Z-axis at the corner 1 of the work pallet is obtained as described above (step S422). Then the head 1 is raised upward to return to the original point of the Z-axis (step S423).

Similarly, each of coordinate values of the Z-axis at each of the corners 2, 3, and 4 on the work pallet is obtained (step S424 to step S432).

Also, as shown in FIG. 1, an ID tag 141 for discretely identifying each electrode 3 is attached to the electrode 3. An ID reader 142 for reading the ID tag 141 attached to the electrode 3 is mounted on the automatic tool (electrode)

exchanger 2. The ID reader 142 is connected to the ATC controller 12 through a cable 143 to transfer the data read out from the ID tag to the ATC controller 12.

Also, an ID tag 151 is attached to each work pallet 5 for discretely identifying each of the work pallets 5. An ID reader 152 for reading the ID tag 151 attached to the work pallet 5 is mounted on the automatic work exchanger 4. The ID reader 152 is connected to the AWC controller 14 through a cable 153 to transfer the data read out from the ID-tag to the AWC controller.

Provided in an electrode feeding section of the automatic tool (electrode) exchanger 2 and a work feeding section of the automatic work exchanger 4 are an ATC door 144 and an AWC door 154 which open without fail when an electrode and a work are fed in and close after the fed-in during machining respectively.

Figure 9:
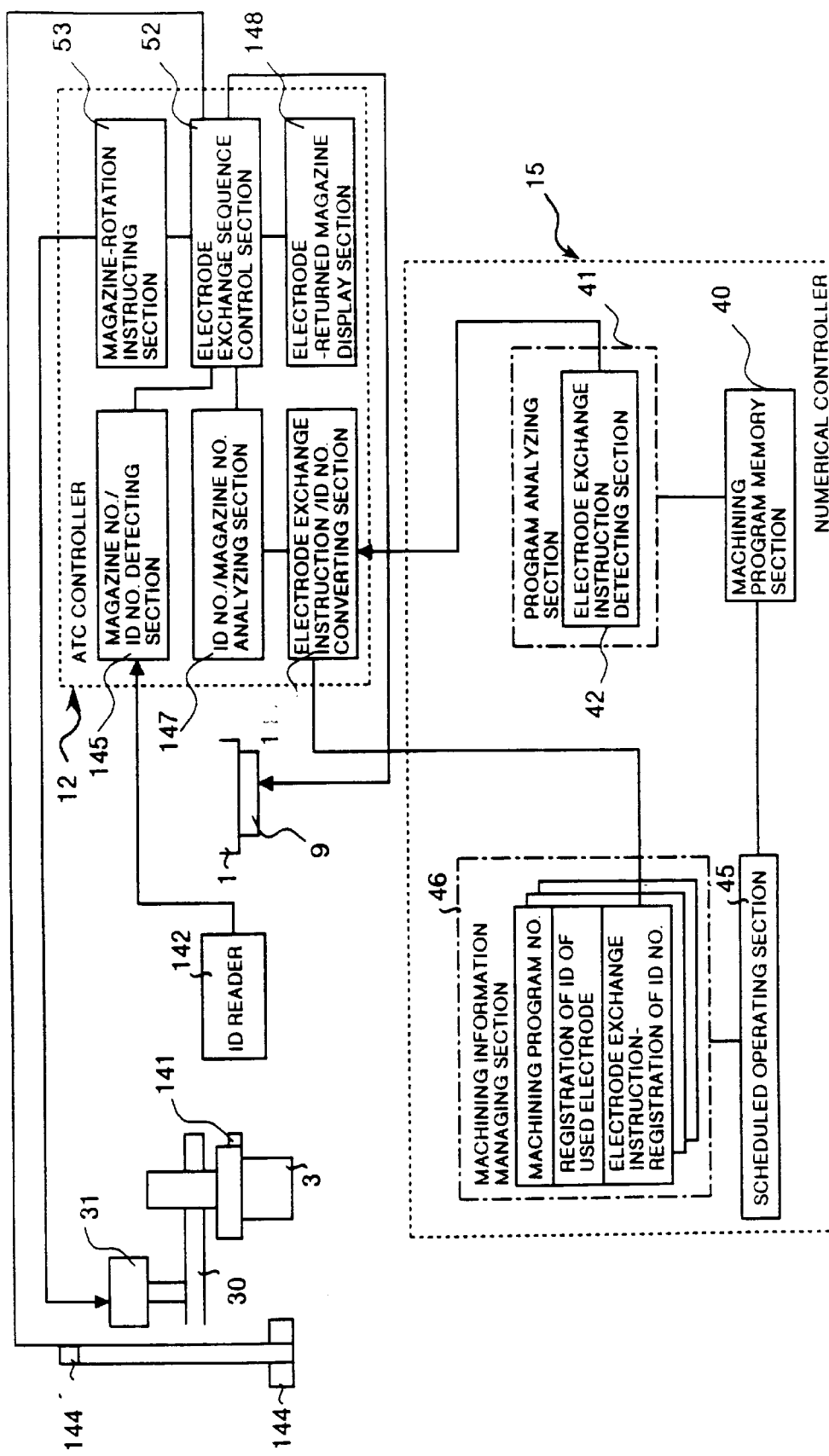
FIG. 9 is a block diagram showing an electrode exchanging system according to an ID tag.
Figure 14:
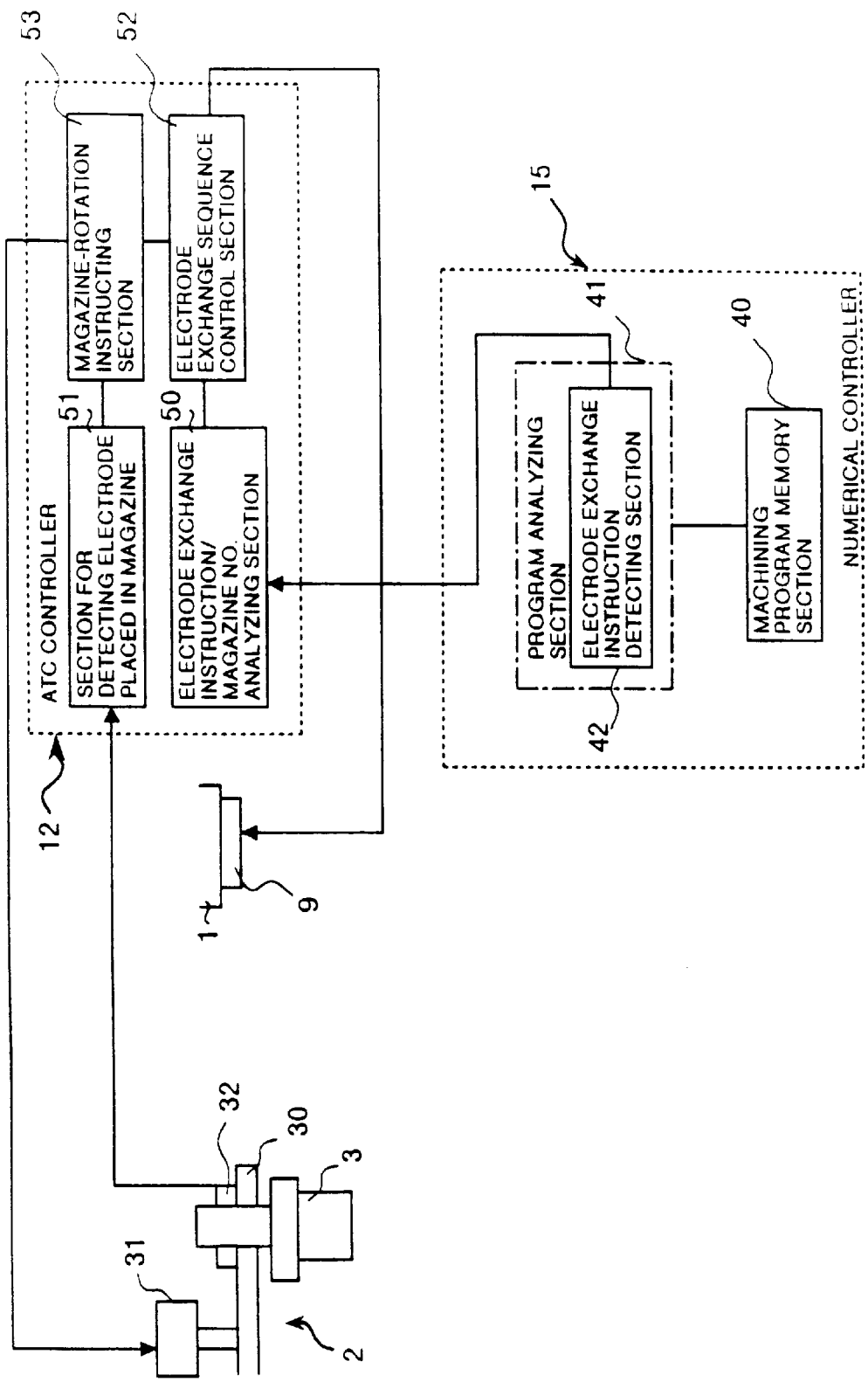
FIG. 14 is a block diagram showing an electrode exchanging system based on the conventional technology.

FIG. 9 shows an electrode exchanging system according to ID tags. It should be noted that, in FIG. 9, the same reference numerals are assigned to the same sections corresponding to those in FIG. 14.

The ID tag 141 stores therein a numerical value (ID number) specific to each electrode in order to discriminate the electrode from others, and the ID reader 142 can read in a noncontact form the ID number from the ID tag 141 of the electrode 3 stored in an electrode magazine 30.

The numerical controller 15 comprises a scheduled operating section 45 for initializing a machining program when machining information required for one machining can be prepared, and a machining information managing section 46 for managing machining information such as an electrode required for one machining, a work, a machining program, and correlated data between an electrode exchange instruction in the machining program and an ID number.

The ATC controller 12 comprises a magazine-number/ID-number detecting section 145 for managing electrodes each having an ID number in each magazine of the automatic electrode exchanger 2 according to the information read-out by the ID reader 142, an electrode exchange instruction/ID-number converting section 146 for converting an electrode exchange instruction to an ID number when an electrode exchange instruction is issued from the numerical controller 15 using the correlated data from the machining information managing section 46 between the electrode exchange instruction and an ID number, an ID-number/magazine-number analyzing section 147 for converting the electrode exchange instruction instructed with the ID number from the electrode exchange instruction/ID-number exchanging section 146 to a magazine number so that an electrode can be mounted on an arbitrary magazine position, and an electrode-returned magazine display section 148.

The electrode exchange sequence control section 52 exchanges electrodes according to ID numbers by comparing an ID number in each magazine of the magazine-number/ID-number detecting section 145 to an ID number of the electrode exchange instruction, and transfers a magazine number of the electrode attached to the main shaft to the electrode-returned magazine display section 148.

Also, the electrode exchange sequence control section 52 receives information on opening/closing of the ATC door 144 from an open/close detector 144' of the ATC door 144 attached to the electrode feeding section of the automatic electrode exchanger 2, and the detector sends a stop signal to the electrode exchange sequence control section 52 when the ATC door 144 is opened, so that, even if an electrode exchange instruction is issued from the program analyzing section 41, the electrode exchange sequence control section 52 neglects the instruction and stops exchanging an electrode to the other executed by the tool magazine 30 as well as by the ATC robot arm 11 (Refer to FIG. 1), and door interlocking is so executed that electrode exchanging operation is started when the ATC door 144 is closed.

With those operations, an electrode required for the next machining can be mounted thereon during scheduled operation, so that continuous unmanned operation can be executed over a long period of time in the nighttime or so.

Figure 10:
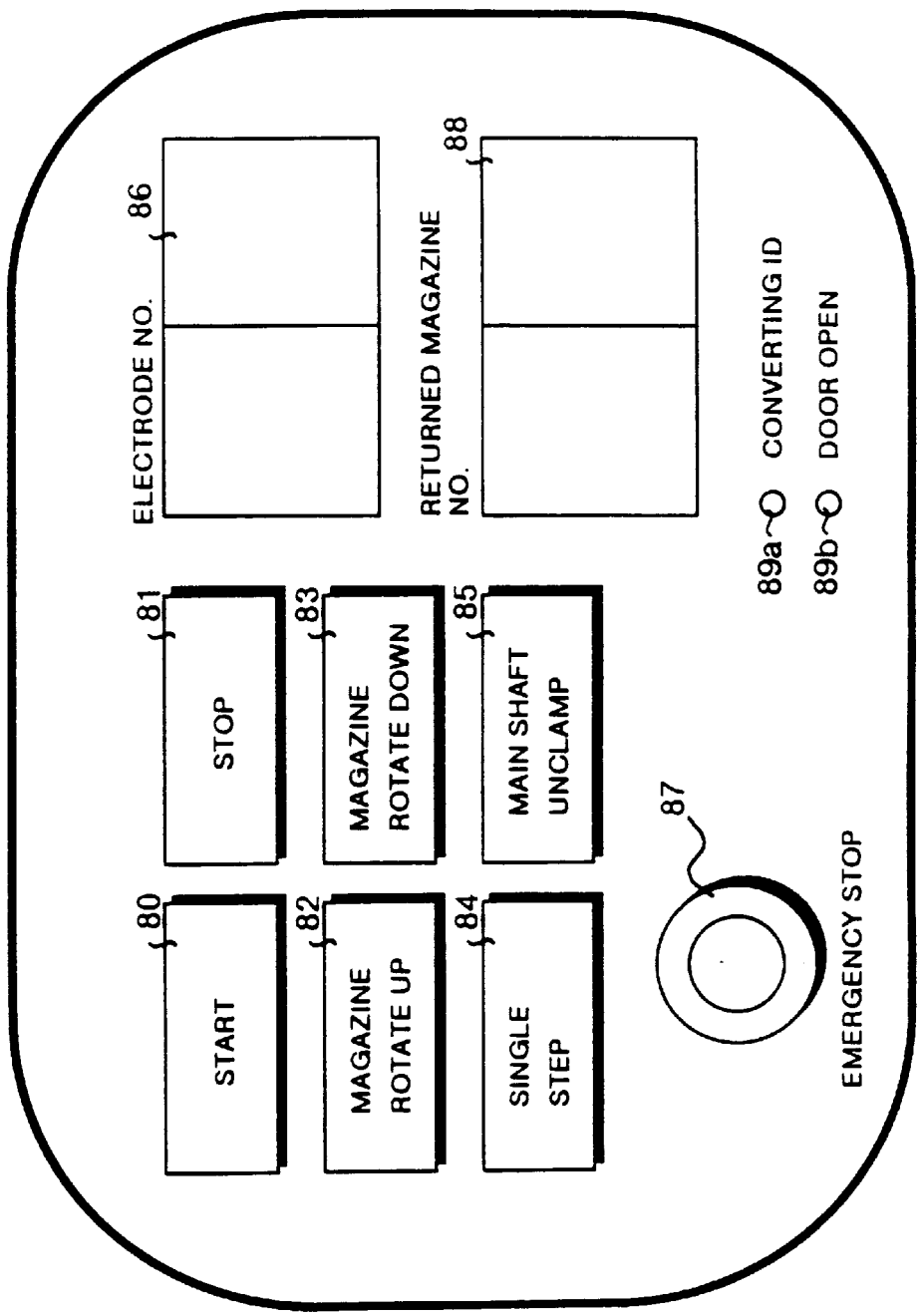
FIG. 10 is an explanatory view showing a control board of the automatic electrode changer.
Figure 16:
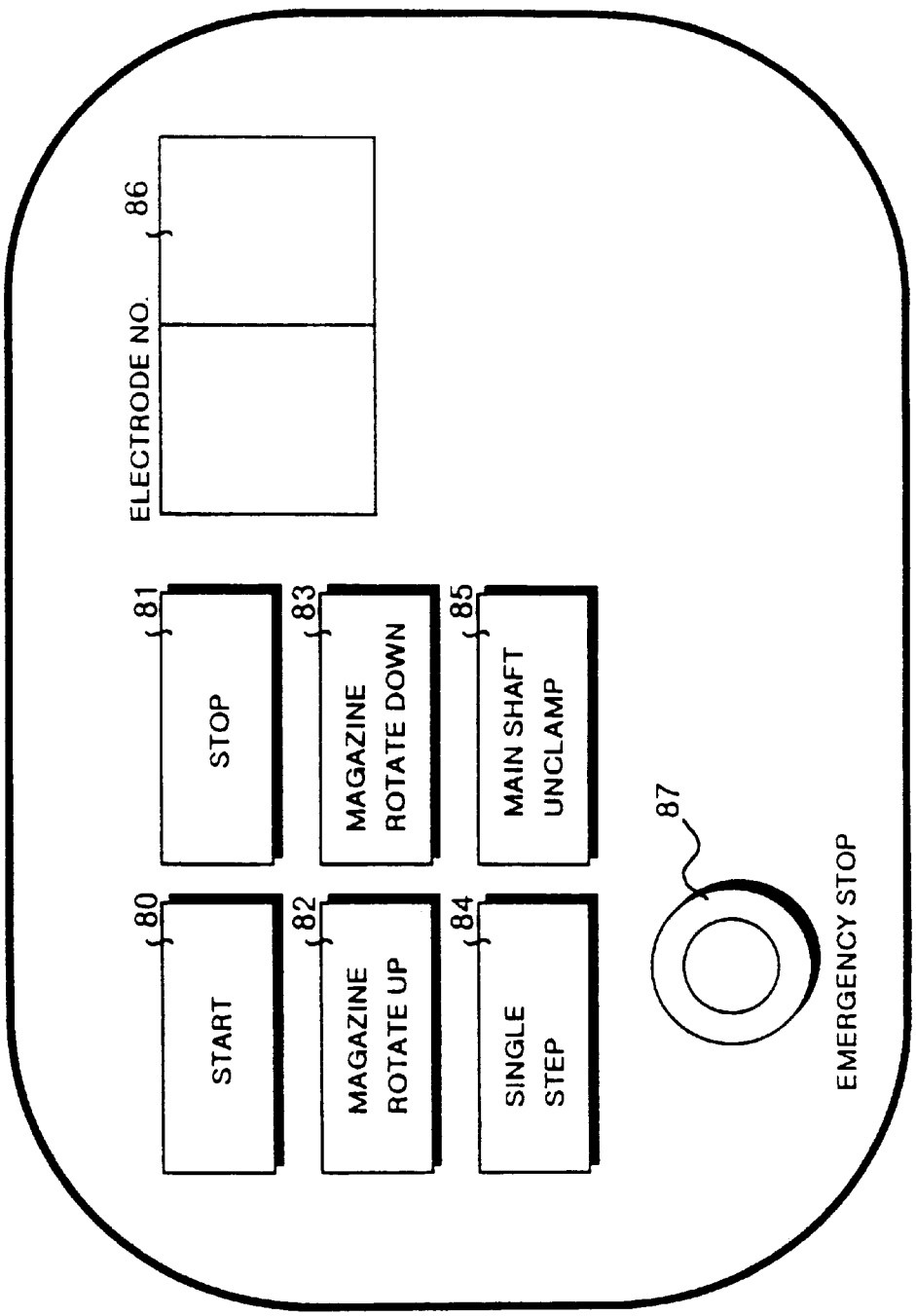
FIG. 16 is an explanatory view showing a control board of the automatic electrode exchanger based on the conventional technology.

FIG. 10 is a control board of the automatic electrode exchanger according to the present invention. It should be noted that, in FIG. 10, the same reference numerals are assigned to the same sections corresponding to those in FIG. 16. A returned magazine number display section 88 for displaying a returned magazine number of the electrode 3 during machining is provided in the control board.

As the returned magazine number of the electrode 3 being machined (in use) is displayed on the returned magazine number display section 88, when an electrode 3 is additionally fed, the operator can feed without fail an electrode 3 used for the next machining in any vacant magazine except the vacant returned magazine for the currently used electrode 3 in the electrode exchanging operation according to ID tags 141 by referring to the displayed contents.

In addition, provided in the control board of the automatic electrode exchanger are, as electrodes are exchanged according to ID tags because the electrode exchange instruction in the machining program is different from a magazine number to actually be exchanged in the electrode exchanging operation according to ID tags 141, an LED 89a for indicating that an electrode may be fed in an arbitrary position except the returned magazine and an LED 89b lighting up when the ATC door 144 is opened according to a signal from the open/close detector 144' of the ATC door 144.

When such work as to feed the next electrode during machining when the ATC door 144 is opened is carried out, the LED 89b is lit up, and the electrode exchanging operation is not started.

Figure 11:
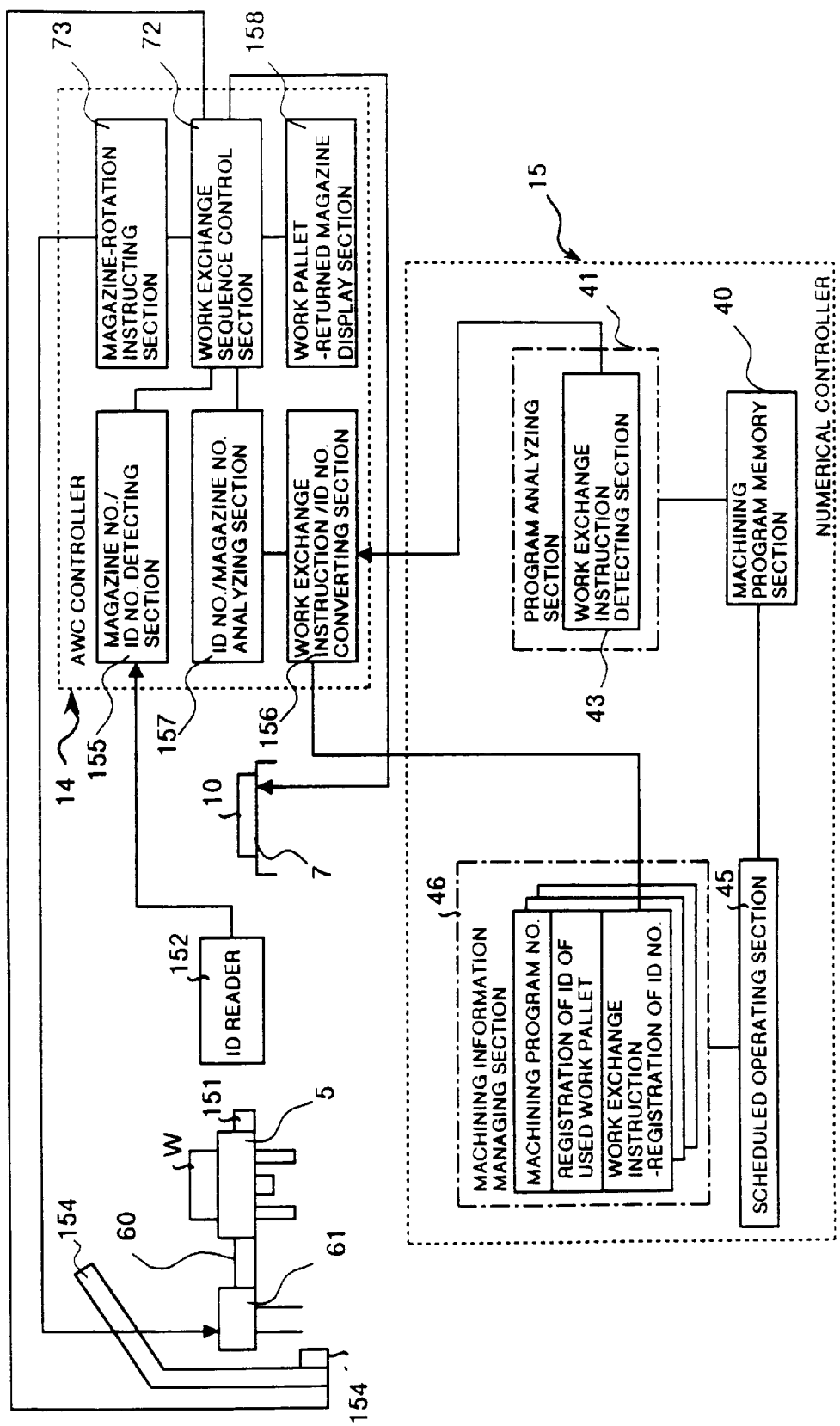
FIG. 11 is a block diagram showing a work pallet exchanging system according to an ID tag.
Figure 15:
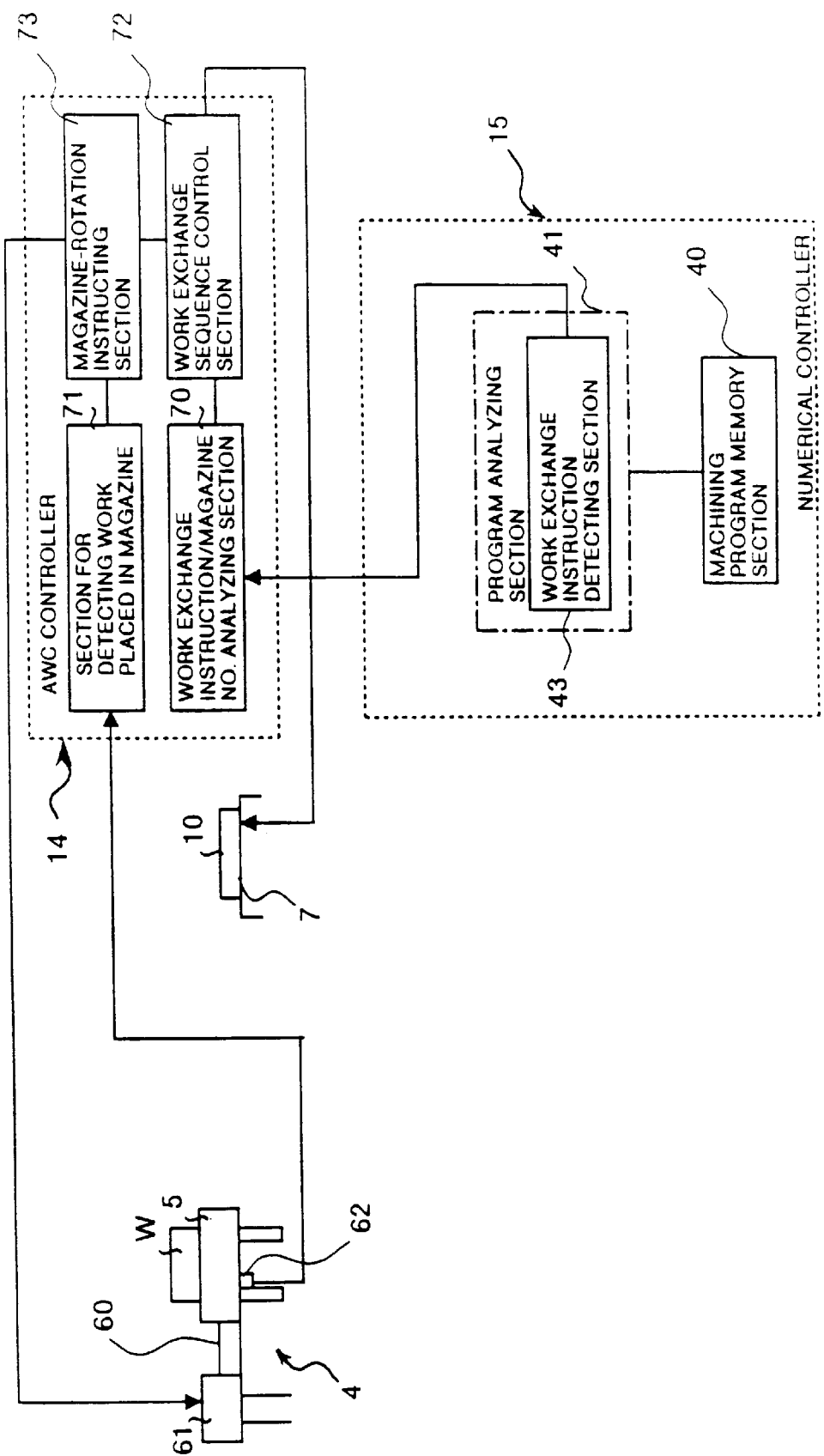
FIG. 15 is a block diagram showing a work pallet exchanging system based on the conventional technology.

FIG. 11 shows a work exchanging system according to ID tags. It should be noted that, in FIG. 11, the same reference numerals are assigned to the same sections corresponding to those in FIG. 15.

The ID tag 151 stores therein a numerical value (ID number) specific to each work pallet in order to discriminate the work pallet (work) from others, and the ID reader 152 can read in a noncontact form the ID number from the ID tag 151 of the pallet 5 stored in the pallet magazine 60.

The numerical controller 15 comprises the scheduled operating section 45 for initializing execution of a machining program when machining information required for one machining can be prepared, and a machining information managing section 46' for managing machining information such as an electrode required for one machining, a work, a machining program, and correlated data between a work exchange instruction in the machining program and an ID number.

The AWC controller 14 comprises a magazine-number/ID-number detecting section 155 for managing works (pallets) each having an ID number in each magazine of the automatic work exchanger 4 according to the information read-out by the ID reader 152, a work exchange instruction/ID-number converting section 156 for converting a work exchange instruction when the work exchange instruction is issued from the numerical controller 15 to an ID number using the correlated data from the machining information managing section 46 between the work exchange instruction and an ID number, an ID-number/magazine-number analyzing section 157 for converting the work exchange instruction instructed with the ID number from the work exchange instruction/ID-number exchanging section 156 to a magazine number, and a work pallet-returned magazine display section 158.

The work exchange sequence control section 72 exchanges works according to ID numbers by comparing an ID number in each magazine of the magazine-number/ID-number detecting section 155 to an ID number of the work exchange instruction, and transfers a magazine number of the work pallet attached to the work chucking device 10 to the work pallet-returned magazine display section 158.

Also, the work exchange sequence control section 72 receives information on opening/closing of the AWC door 154 from an open/close detector 154' of the AWC door 154 attached to the pallet feeding section of the automatic work exchanger 4, and the detector sends a stop signal to the work exchange sequence control section 72 when the AWC door 154 is opened, so that, even if a work exchange instruction is issued from the program analyzing section 41, the work exchange sequence control section 52 neglects the instruction and stops the operation for exchanging a work executed by the pallet magazine 60 as well as by the AWC robot arm 13 (Refer to FIG. 1), and so-called door interlocking is executed so that work exchanging operation is started when the AWC door 154 is closed.

With those operations, a work required for the next machining can be mounted thereon during scheduled operation, so that continuous unmanned operation can be executed over a long period of time in the nighttime or so.

Figure 12:
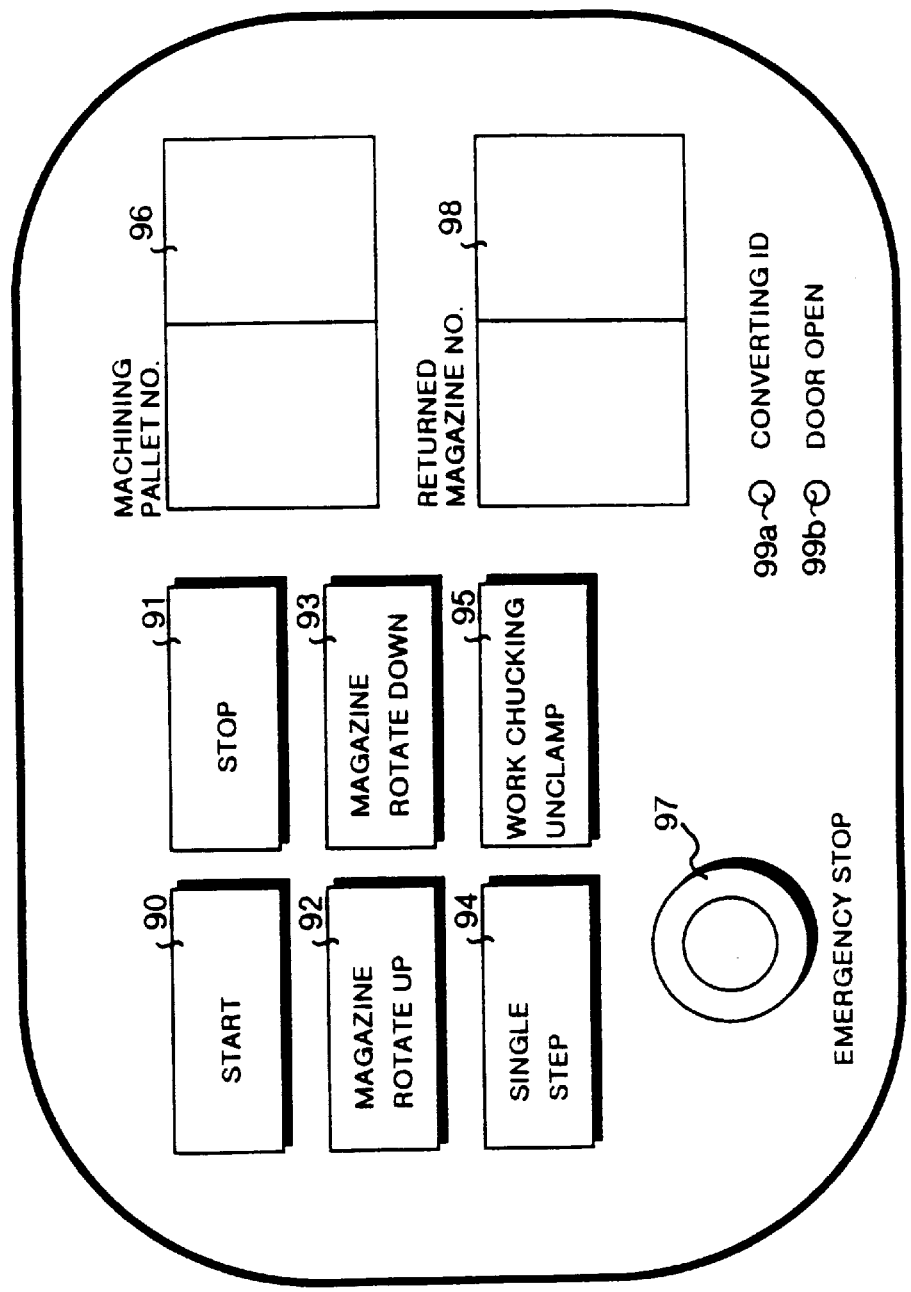
FIG. 12 is an explanatory view showing a control board of the automatic work changer.
Figure 13:
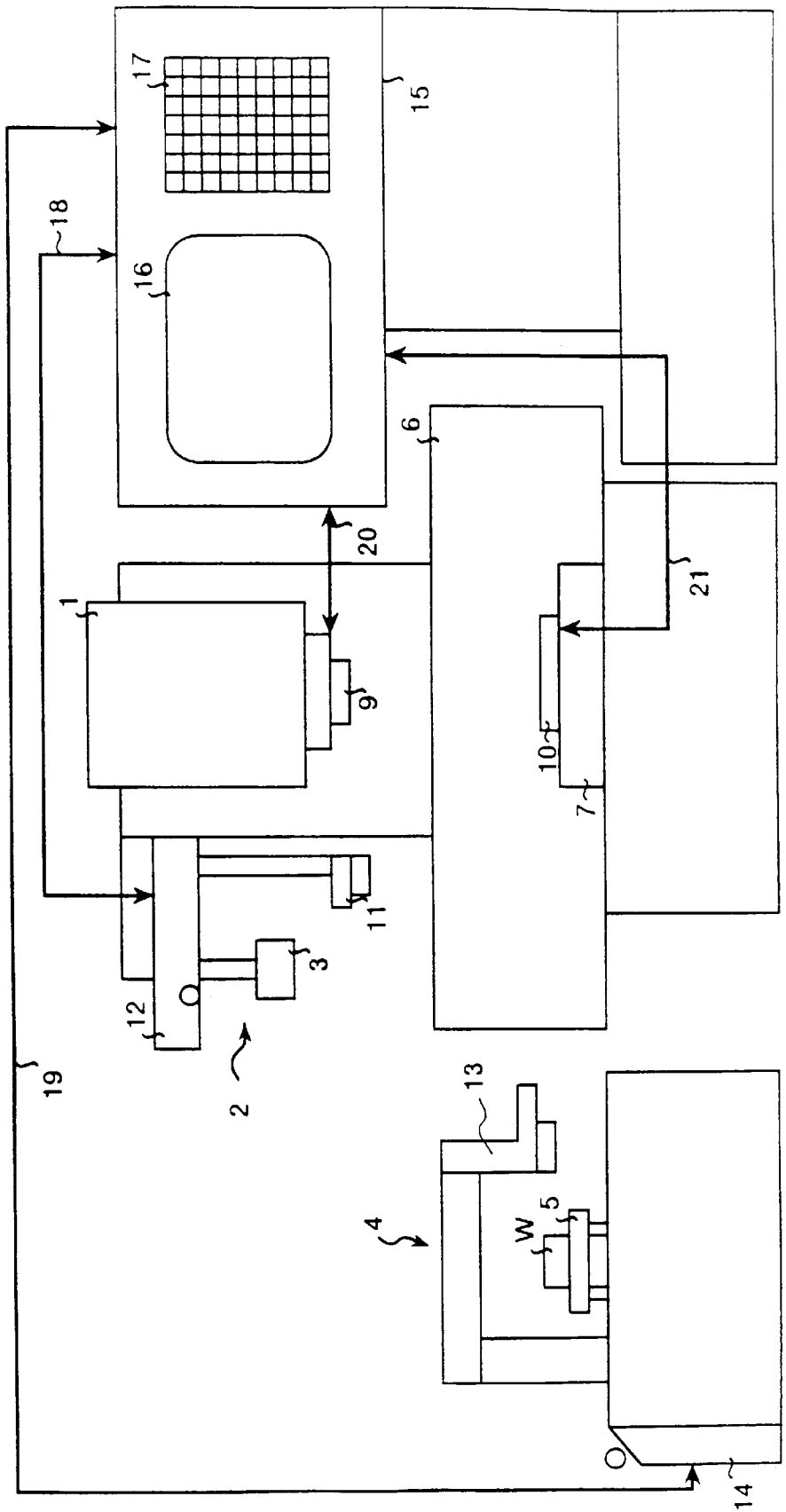
FIG. 13 is a block diagram showing an electric discharge machining automation system based on the conventional technology.
Figure 17:
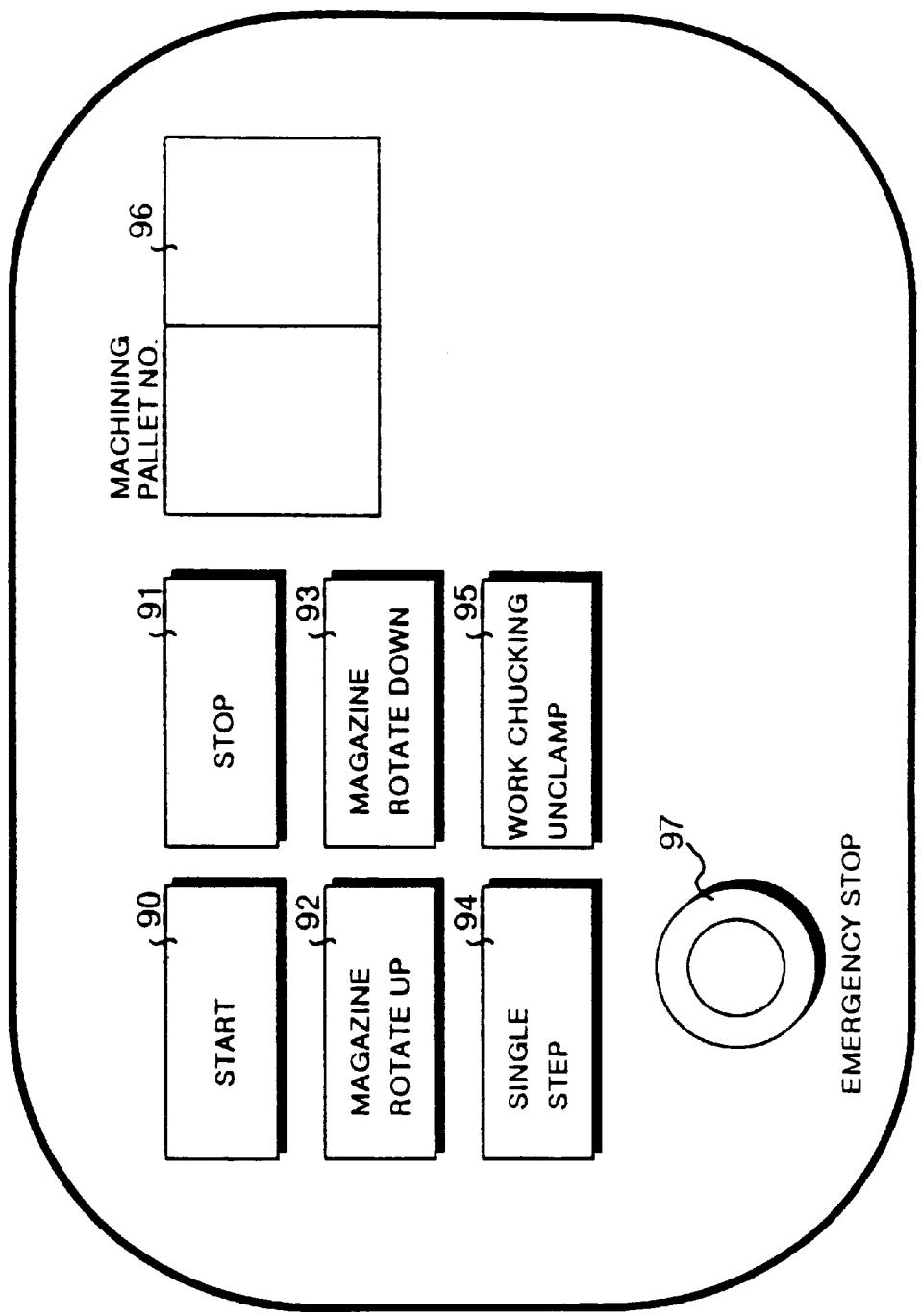
FIG. 17 is an explanatory view showing a control board of the automatic work exchanger based on the conventional technology.

FIG. 12 is a control board of the automatic work exchanger according to the present invention. It should be noted that, in FIG. 12, the same reference numerals are assigned to the same sections corresponding to those in FIG. 17. A returned magazine number display section 98 for displaying a returned magazine number of the work pallet 5 during machining is provided in the control board.

As the returned magazine number of the work pallet 5 during the machining (in use) is displayed on the returned magazine number display section 98, the operator who additionally fed the work pallet 5 can feed without fail a work pallet 5 used for the next machining in any vacant magazine except the vacant magazine for the currently used work pallet 5 in the work exchanging operation according to ID tags 151 by referring to the displayed contents.

In addition, provided in the control board of the automatic work exchanger are, as works are exchanged according to ID tags because the work exchange instruction in the machining program is different from a magazine number to actually be exchanged in the work exchanging operation according to ID tags 151, an LED 99a for indicating that a work pallet 5 may be fed in an arbitrary position except the returned magazine and an LED 99b lighting up when the AWC door 154 is opened according to a signal from the open/close detector 154' of the AWC door 154.

When such a work as to feed a work pallet mounting thereon a work required for the next machining during machining when the AWC door 154 is opened is performed, the LED 99b is lit up, and the work exchanging operation is not started.

As understood from the above description, with the electric discharge machining apparatus according to the present invention, when a work pallet is to be taken away from the work chucking device in the machining vessel after completion of machining, the air blower blows air onto the work pallet on the work chucking device before the work pallet is carried away therefrom, so that a machining liquid deposited on the work pallet is blown off and cleared therefrom, and for this reason a machining liquid containing some sludge does not drop onto the mounted surface of the work pallet when the work pallet is carried away therefrom, and precision in exchanging work pallets can be maintained, which makes it possible to continuously run the apparatus over a long period of time under scheduled operation.

With the electric discharge machining apparatus according to another feature of the present invention, air is blown out from the air blower while the head is moved in accordance with a size of the work pallet, so that a machining liquid deposited on the work pallet is blown off and cleared therefrom regardless of the size of a work pallet, and for this reason a machining liquid containing some sludge does not drop onto the mounted surface of the work pallet, regardless of the size of a work pallet, when the work pallet is carried away therefrom, and precision in exchanging work pallets can be maintained, which makes it possible to continuously run the apparatus over a long period of time under scheduled operation.

With the electric discharge machining apparatus according to another feature of the present invention, when a deviation between a pallet position measured by the pallet position measuring means and a specified pallet position is not less than an allowable value, the automatic work exchanger carries away the same work pallet from and carries it again onto the work chucking device, so that precision in exchanging work pallets can be maintained, which makes it possible to continuously run the apparatus over a long period of time under scheduled operation.

With the electric discharge machining apparatus according to another feature of the present invention, the work-chucking surface of the work chucking device is cleaned by blowing air thereonto by the air blower after the work pallet is carried away from the work chucking device, so that even when some sludge is deposited on the mounted surface of the work pallet, precision in exchanging work pallets can be maintained, which makes it possible to continuously run the apparatus over a long period of time under scheduled operation.

With the electric discharge machining apparatus according to another feature of the present invention, the ID reader reads an ID number of an ID tag attached to an electrode, the magazine-number/ID-number detecting section manages electrodes each having an ID number which is stored in each magazine of the automatic electrode exchanger according to the read-out information by the ID reader, the electrode-number instruction/ID-number converting section converts an electrode exchange instruction according to the electrode number to an ID number using the correlated data from the machining information managing section between the electrode exchange instruction and the ID number, the ID-number/magazine-number analyzing section converts the electrode exchange instruction according to the ID number to a magazine number according to the information from the machining information managing section when the electrode exchange instruction is issued for electrode exchanging operation according to ID numbers, and the returned magazine number display section displays a returned magazine number of the electrode attached to the main shaft of the electric discharge machining apparatus, so that such malfunction due to human error that an electrode used for the next machining has erroneously be mounted on the returned magazine for the currently machined electrode when it is to be fed is minimized, and termination of the apparatus due to error can be reduced, which makes it possible to continuously run the apparatus over a long period of time under scheduled operation.

With the electric discharge machining apparatus according to another feature of the present invention, the ID reader reads an ID number of an ID tag attached to a work pallet, the magazine-number/ID-number detecting section manages work pallets each having an ID number which is stored in each magazine of the automatic work exchanger according to the read-out information by the ID reader, the work-number instruction/ID-number converting section converts a work exchange instruction according to the work number to an ID number using the correlated data from the machining information managing section between the work exchange instruction and the ID number, the ID-number/magazine-number analyzing section converts the work exchange instruction according to the ID number to a magazine number according to the information from the machining information managing section when the work exchange instruction is issued for work exchanging operation according to ID numbers, and the returned magazine number display section displays a returned magazine number of the work pallet attached in the machining vessel of the electric discharge machining apparatus, so that such malfunction due to human error that a work pallet mounting thereon a work used for the next machining has erroneously be mounted on the returned magazine for the work pallet mounting thereon the currently machined work when it is to be fed is minimized, and termination of the apparatus due to error can be reduced, which makes it possible to continuously run the apparatus over a long period of time under scheduled operation.

With the electric discharge machining apparatus according to another feature of the present invention, when the ATC door is opened, even if an electrode exchange instruction is issued, the instruction is neglected, and door interlocking is so executed that electrode exchanging operation is executed again when the ATC door is closed, so that an electrode required for the next machining can be mounted thereon during the scheduled operation, and for this reason setup processes in which an electrode used for the next scheduled operation is fed in the automatic electrode exchanger before the program used in current machining is ended can be accumulated, the setup processes by the operator are executed in the daytime, and machining processes such as electrode exchanging operation and electric discharge machining are automatically executed, whereby a period of time for continuous unmanned operation thereof can be prolonged.

With the electric discharge machining apparatus according to another feature of the present invention, when the AWC door is opened, even if a work exchange instruction is issued, the instruction is neglected, and door interlocking is so executed that work exchanging operation is executed again when the AWC door is closed, so that a work required for the next machining can be mounted thereon during the scheduled operation, and for this reason setup processes in which a work used for the next scheduled operation is fed in the automatic work exchanger before the program used in current machining is ended can be accumulated, the setup processes by the operator are executed in the daytime, and machining processes such as electrode exchanging operation and electric discharge machining are automatically executed, whereby a period of time for continuous unmanned operation thereof can be prolonged.

This application is based on Japanese patent application No. HEI 9-106450 filed in the Japanese Patent Office on Apr. 23, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electric discharge machining apparatus comprising:
   a pallet position measuring unit for measuring a pallet position of a work pallet carried onto the work chucking device in the machining vessel by an automatic work exchanger which accompanies the electric discharge machining apparatus; wherein,
   when a deviation between a pallet position measured by said pallet position measuring unit and a specified pallet position is not less than an allowable value, said automatic work exchanger carries away the work pallet from and carries it again onto said work chucking device.

2. An electric discharge machining apparatus according to claim 1; wherein the work-chucking surface of said work chucking device is cleaned by blowing air thereonto by the air blower after the work pallet is carried away from said work chucking device.

3. An electric discharge machining apparatus comprising:
   a head for holding a machining electrode,
   a workpiece chucking device for positioning a workpiece pallet relative to said machining electrode,
   an air blower held by said head; wherein after completion of machining but before exchanging said workpiece pallet, said air blower operates to blow air onto said workpiece pallet to remove deposited machining fluid, and
   means for moving said head to plural air-blowing positions in accordance with the dimensions of said workpiece pallet.

* * * * *